United States Patent [19] [11] 4,264,046
Nattel et al. [45] Apr. 28, 1981

[54] ELECTRICAL BUSHING CLAMP

[75] Inventors: William Nattel, Cote St-Luc; Hardy Mihailescu, Montreal, both of Canada

[73] Assignee: GTE Sylvania Canada Limited, St. Jean, Canada

[21] Appl. No.: 86,109

[22] Filed: Oct. 18, 1979

[51] Int. Cl.³ .............................................. F16L 5/00
[52] U.S. Cl. .................................. 248/56; 174/153 G
[58] Field of Search ........... 248/56; 174/153 G, 65 G, 174/162; 285/159; 24/265 R, 16 PB; 16/2; 339/103 B

[56] References Cited

U.S. PATENT DOCUMENTS

| | | | |
|---|---|---|---|
| 3,056,852 | 10/1962 | Sachs | 174/153 G |
| 3,689,014 | 9/1972 | Fink | 248/56 |
| 3,866,870 | 2/1975 | Nicholson | 248/56 |
| 4,000,875 | 1/1977 | Jemison | 248/56 |
| 4,033,535 | 7/1977 | Moran | 339/103 B X |
| 4,034,944 | 7/1977 | Moran | 248/56 |
| 4,117,998 | 10/1978 | Notoya | 248/56 |
| 4,125,238 | 11/1978 | Tanaka | 248/56 |
| 4,137,602 | 2/1979 | Klumpp | 174/153 G X |
| 4,142,064 | 2/1979 | Thomsen | 248/56 X |
| 4,180,227 | 12/1979 | Gretz | 248/56 |

Primary Examiner—J. Franklin Foss
Attorney, Agent, or Firm—Jerry F. Janssen

[57] ABSTRACT

Electrical bushing and cable clamp device for non-metallic sheathed cable. The clamp device has a body member with passageway for cable and clamping members selectively insertable in the passageway for clamping a variety of cable sizes. Clamping members are tethered to the body member by flexible and resilient tether strips which bias the clamping members when inserted into the passageway.

The bushing and cable clamp device provides for insertion of a cable in the device either prior to or subsequent to installation of the device in an electrical wiring box and for facile repositioning of a cable clamped in the device without the need for tools.

11 Claims, 13 Drawing Figures

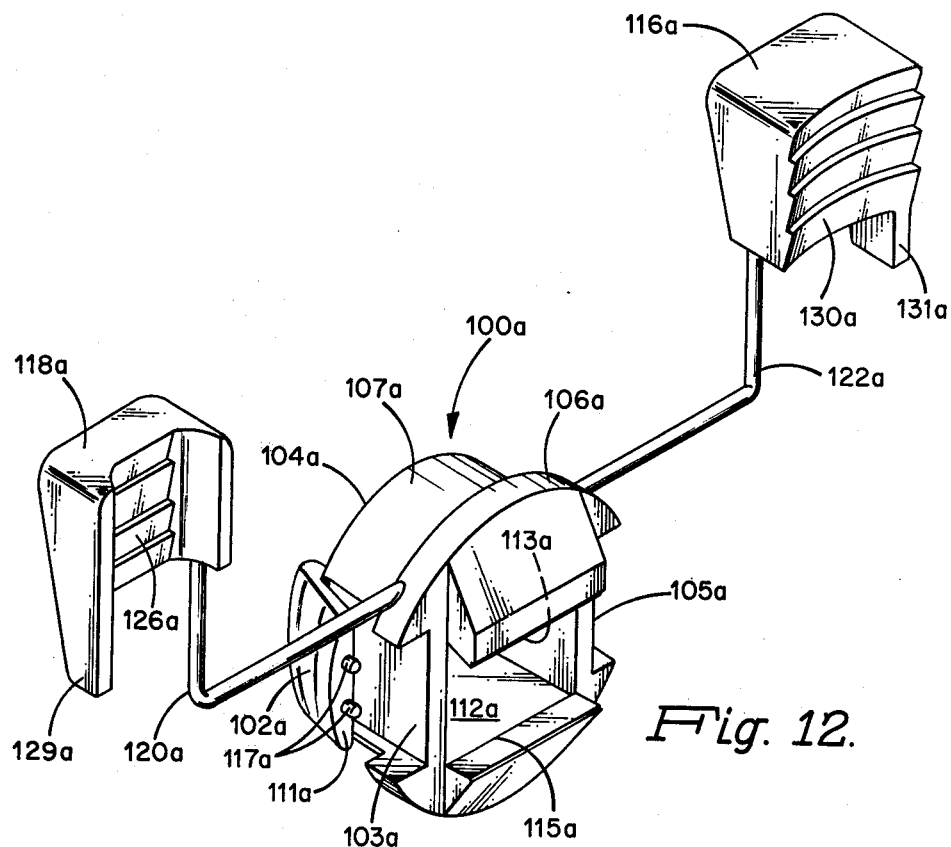
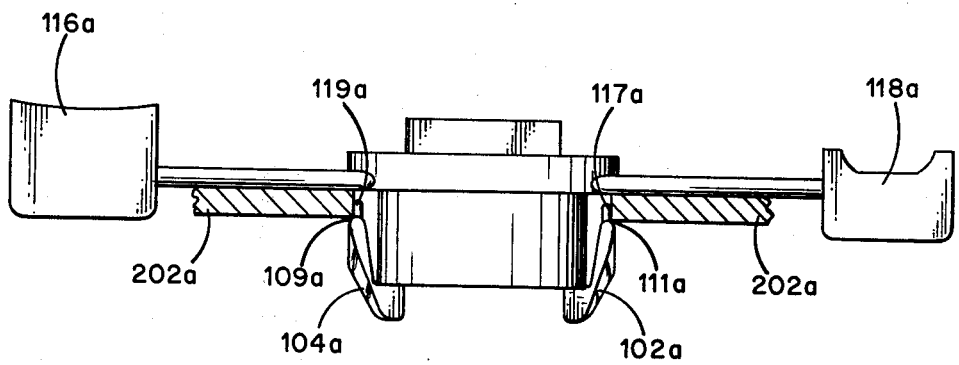

ELECTRICAL BUSHING CLAMP

BACKGROUND OF THE INVENTION

This invention relates to bushing clamp devices. More particularly, this invention is concerned with an improved electrical bushing clamp for non-metallic sheathed cable.

Many known bushing clamp devices, of the type disclosed in U.S. Pat. No 3,424,856, for example, require the cable to be inserted into the clamp prior to installation of the clamp device in a knock-out aperture. With such clamp devices, the cable is clamped simultaneously with the installation of the bushing clamp in the knock-out aperture. Clamp devices of this type neither allow for the insertion of a cable subsequent to the installation of the clamp in a knock-out aperture, nor for the repositioning of the cable in the clamp device without removal of the clamp from the knock-out aperture.

In another known type of bushing clamp, the cable is clamped by means of a member driven against the cable by a screw or bolt, for example, as disclosed in U.S. Pat. No. 2,973,212. Clamp devices of the type disclosed in Canadian Pat. No. 833,156, for example, employ a clamping member which binds the cable by sliding against it at right angles. While clamp devices of these latter two types do permit the installation of the clamp device in a wiring box prior to insertion of a cable, they do not allow for repositioning a clamped cable without partial disassembly of the clamp device, often requiring the aid of a tool.

OBJECTS OF THE INVENTION

It is therefore an object of the present invention to provide an improved electrical bushing clamp which allows for the insertion of a cable into the clamp both prior to or subsequent to the installation of the clamp device in an electrical wiring box knock-out aperture.

It is another object of the present invention to provide an improved electrical bushing clamp which permits repositioning of a clamped cable without the need of a tool or the disassembly of the clamped device or its removal from a wiring box knock-out aperture.

SUMMARY OF THE INVENTION

These and still further objects are achieved by the present invention which comprises an electrical bushing clamp for use with non-metallic sheathed cable, the bushing clamp comprising a tubular body member, a clamping member and a biasing means.

The tubular body member is provided with means for securing the bushing clamp in a knock-out aperture of an electrical wiring box, and with a passageway with an entrance port and an exit port to permit the passage of a cable through the bushing clamp.

The tubular body member of the clamp has first and second interior surfaces which define opposed walls of the passageway. The first interior surface provides a first engaging means for engaging a cable passed through the bushing clamp. The second interior surface of the tubular body member is angled or sloped with respect to the first interior surface, whereby the entrance port is smaller than the exit port.

A clamping member, insertable into the passageway, is provided with opposite first and second exterior surfaces angled or sloped with respect to one another. The first exterior surface of the clamping member is adapted to slidably coact with the second interior surface of the tubular body member when the clamping member is inserted into the passageway. The second exterior surface provides a second cable engaging means for engaging a cable passed through the bushing clamp.

A biasing means urges the clamping member in a direction towards the entrance port when the clamping member is inserted in the passageway.

When a cable is passed through the clamp with the clamping member in the passageway, the cable lies between the first and second cable engaging means. Movement of the clamping member or cable in a direction from the exit port to the entrance port causes the clamping member to move slidably in the passageway, binding down upon and firmly clamping the cable between the first and second cable engaging means. Movement of the clamping member or cable in a direction from the entrance port to the exit port causes the clamping member to move slidably in the passageway, releasing the cable.

BRIEF DESCRIPTION OF THE DRAWING

In the drawing:

FIG. 12 is a front perspective view of an alternative embodiment of a bushing clamp in accordance with the present invention.

FIG. 13 is a top view of the bushing clamp of FIG. 12 inserted in a knock-out aperture of an electrical wiring box with a partial cutaway of the box wall shown.

DETAILED DESCRIPTION

Figure 1:
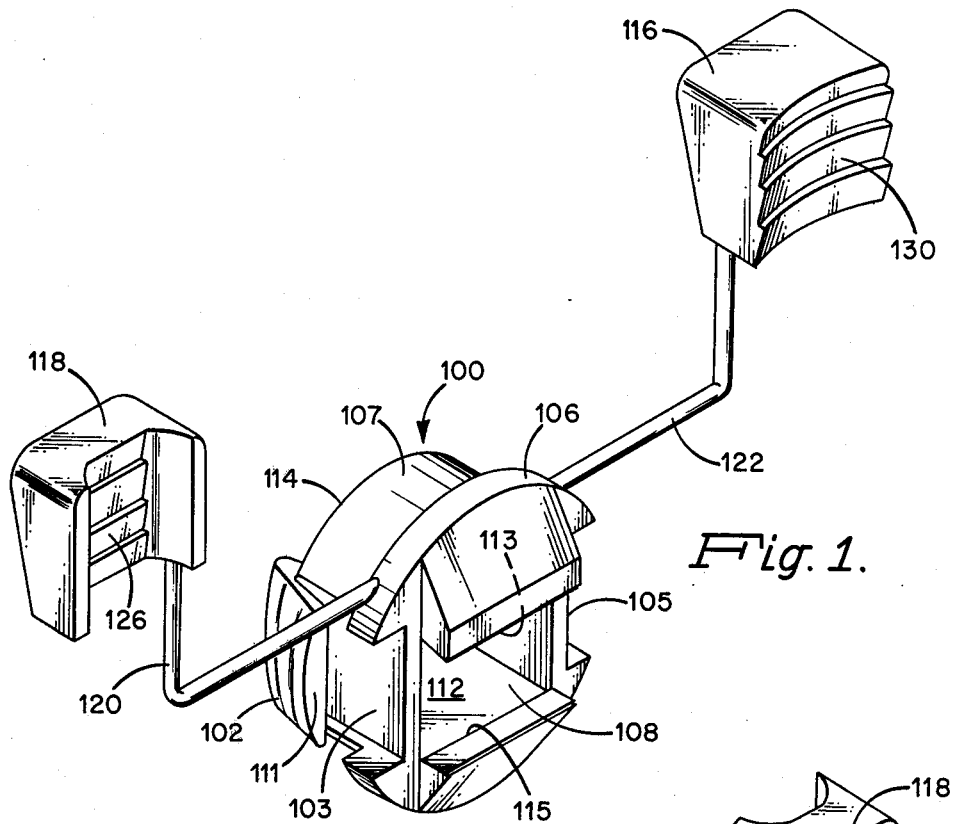
FIGS. 1 and 2 illustrate in front and rear perspective views, respectively, an electrical bushing clamp in accordance with the present invention
Figure 2:
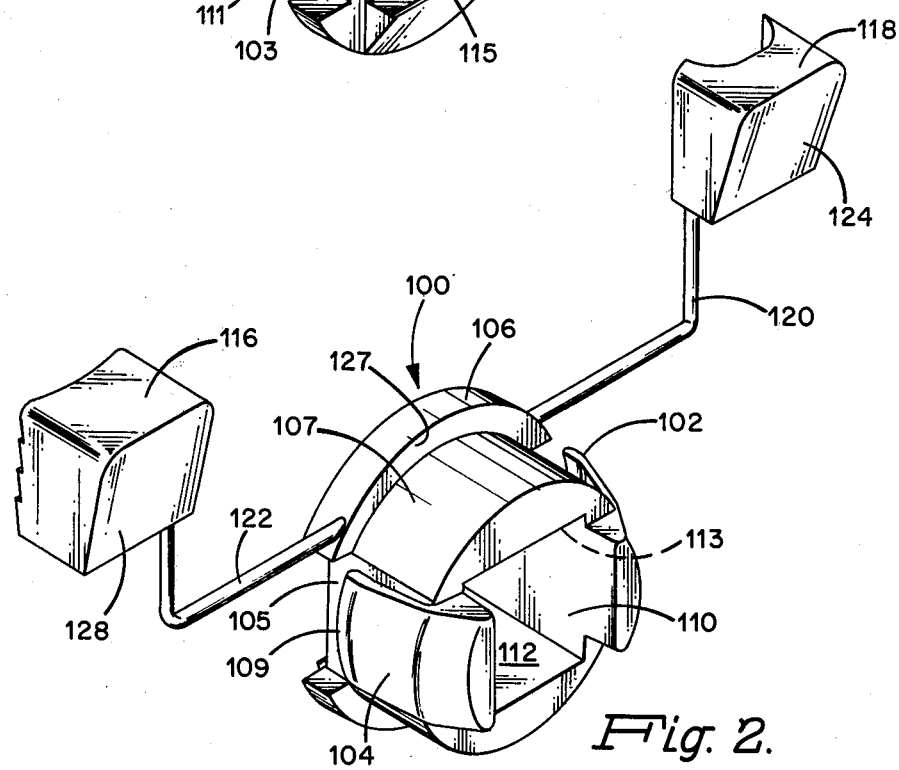

In the embodiment of the invention shown in FIGS. 1 and 2, an electrical bushing clamp 100 of unitary construction is shown comprising a tubular body member 114 and a pair of clamping members 116 and 118 attached to the body member 114 by flexible and resilient tethers 120 and 122.

The tubular body member 114 is generally of cylindrical shape with a body portion 107 chosen to be slightly smaller than standard electrical wiring box knock-out apertures. A retaining flange 106 on body member 114, of a diameter larger than body portion 107, prevents the bushing clamp 100 from passing completely through a wiring box knock-out aperture.

A central passageway passes through the bushing clamp 100, the passageway having an entrance port 108 and an exit port 110. As shown in FIGS. 1 and 2, the passageway is of rectangular cross-section, although circular or other cross-sectional shapes are contemplated.

The passageway is defined by interior surfaces of the body member 114, two surfaces defining opposed walls 112 and 113 of the passageway. One surface 112, forming the floor of the passageway, is provided with sharp serrations 115 which engage a cable inserted through the passageway.

As shown in FIGS. 5-8 in cross-section, an opposed wall 113, forming the roof of the passageway, is angled or sloped upward or away from the passageway wall 112 proceeding from the entrance port 108 to the exit port 110. In this manner, the entrance port 108 of the passageway is smaller than the exit port 110.

Referring to FIGS. 1 and 2, tubular body member 114 is provided with a pair of flexible and resilient flaps or ears 102 and 104 attached at one end of each to the body member 114. The ears 102 and 104 extend outward at an angle from tubular body member 114, ending at distal surfaces 109 and 111 which are opposed to and spaced apart from the inner surface 127 of retaining flange 106.

During insertion of a bushing clamp 100 in a knock-out aperture of an electrical wiring box, the ears or flaps 102 and 104 flex inwardly toward body member 114, moving into recesses 103 and 105 to permit the bushing clamp 100 to enter the knock-out aperture. Once inside the wiring box wall, ears 102 and 104 snap outwardly, restoring to their original positions.

Figure 10:
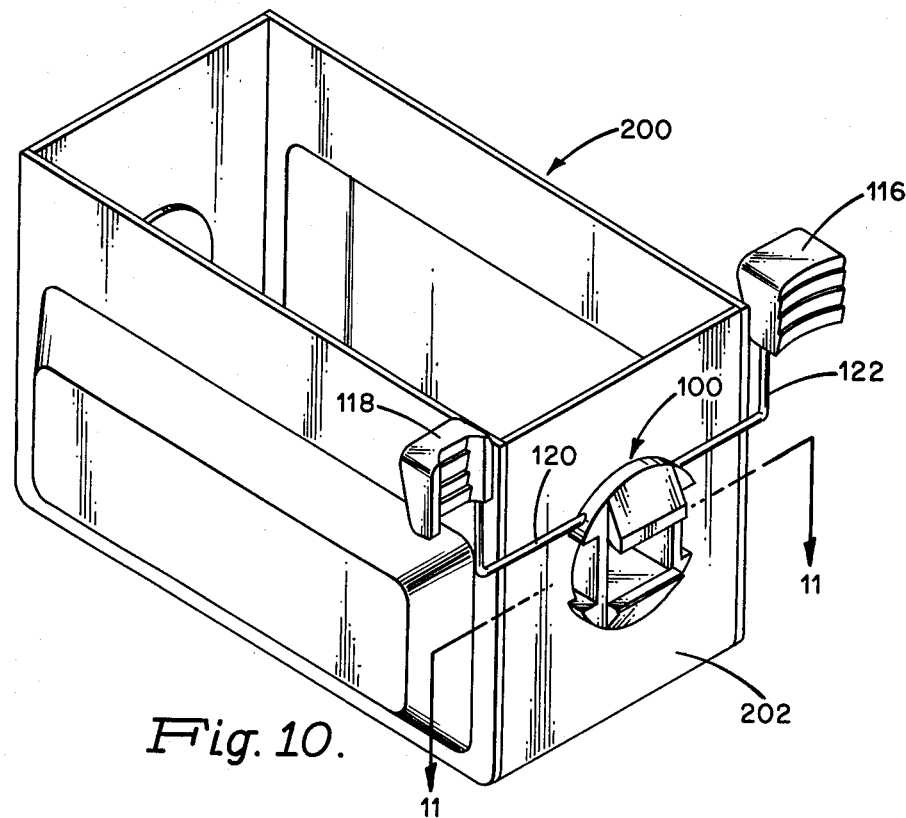
FIG. 10 illustrates the electrical bushing clamp of FIGS. 1 and 2 installed in a knock-out aperture of an electrical wiring box.
Figure 11:
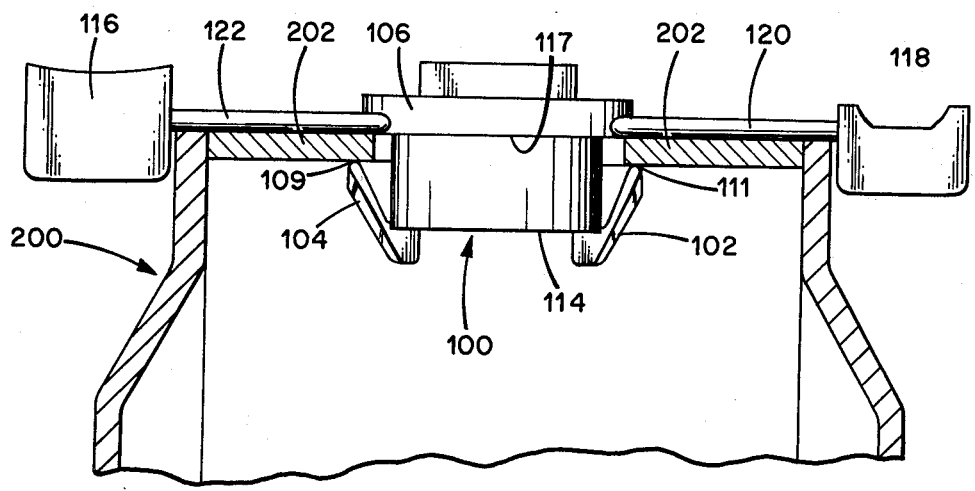
FIG. 11 is a cut-away view of the bushing clamp of FIGS. 1 and 2 installed in a knock-out aperture of an electrical wiring box, the cut taken generally along line 11—11 of FIG. 10.

As shown in FIG. 10 and in cut-away detail in FIG. 11, bushing clamp 100 is inserted in a knock-out aperture of an electrical wiring box 200. The clamp device 100 is secured to the box wall 202 by the opposed action of the inner surface 127 of retaining flange 106 bearing against the outer surface of the box wall 202, and the distal surfaces 109 and 111 of the ears 104 and 102, respectively, bearing against the inner surface of the box wall 202.

In an alternative embodiment of the present invention shown in FIGS. 12 and 13, protrusions 117a and 119a are provided on distal surfaces 111a and 109a, respectively, of the clamp securing ears 102a and 104a. As shown in FIGS. 12 and 13, the protrusions take the form of a pair of pins on each ear distal surface, although other shapes are contemplated as, for example, a single arcuate protrusion.

When bushing clamp 100a is inserted in a wiring box knock-out aperture, as shown in FIG. 13, the protrusions 117a and 119a prevent excessive lateral movement of the securing flaps or ears 102a and 104a as they snap outwardly upon insertion of the clamp device 100a in the knock-out aperture. While still permitting portions of the distal surfaces 109a and 111a to bear against the inner surface of the box wall 202a, the protrusions 117a and 119a prevent any outward splaying of the retaining ears 102a and 104a when a strong force is applied to remove the clamp device 100a from the knock-out aperture.

Facile removal of the bushing clamp of FIGS. 1 and 2 or the alternative embodiment shown in FIGS. 12 and 13 from a wiring box knock-out aperture may be accomplished, however, by pressing one of the flexible ears, for example, ear 104 of FIG. 11, inwardly toward body member 114 into its corresponding recess, and then pushing the bushing clamp out of the knock-out aperture.

Referring to the embodiment of the present invention shown in FIGS. 1 and 2, the bushing clamp 100 has a pair of clamping members 116 and 118 attached to the tubular body member 114 by flexible and resilient tether strips 120 and 122.

Clamping member 116 has a pair of opposite exterior surfaces 128 and 130 which are angled or sloped toward one another to give clamping member 116 a generally wedged shape. Surface 130 has a shallow arcuate, concave curvature and is serrated to engage a non-metallic sheathed cable when clamping member 116 is inserted in the passageway of body member 114.

Clamping member 118 likewise has a pair of opposite exterior surfaces 124 and 126, angled or sloped with respect to one another to give clamping member 118 a generally wedged shape. Surface 126 has a deep arcuate, concave curvature and is serrated to engage a non-metallic sheathed cable when clamping member 116 is inserted in the passageway of body member 114.

Figure 3:
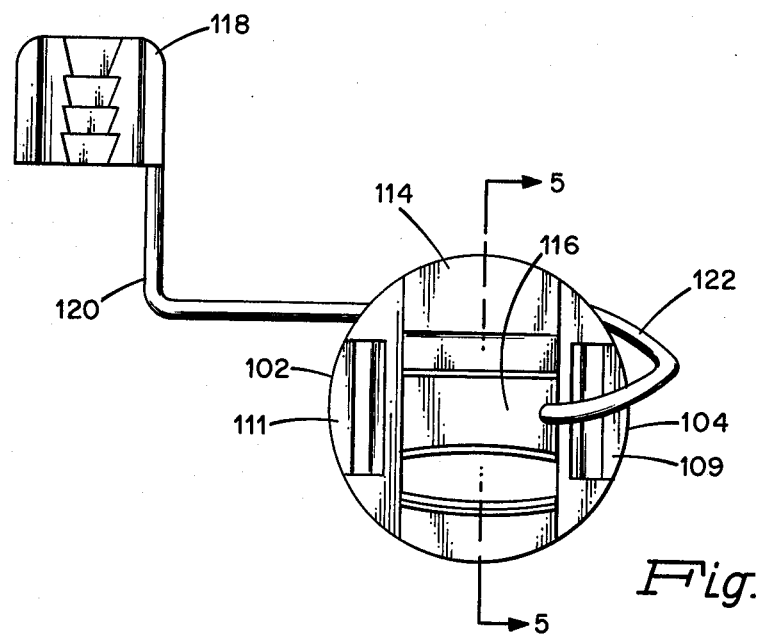
FIG. 3 illustrates in front view the electrical bushing clamp of FIGS. 1 and 2 with the clamping member for accomodating smaller cable sizes inserted in the clamp passageway.
Figure 4:
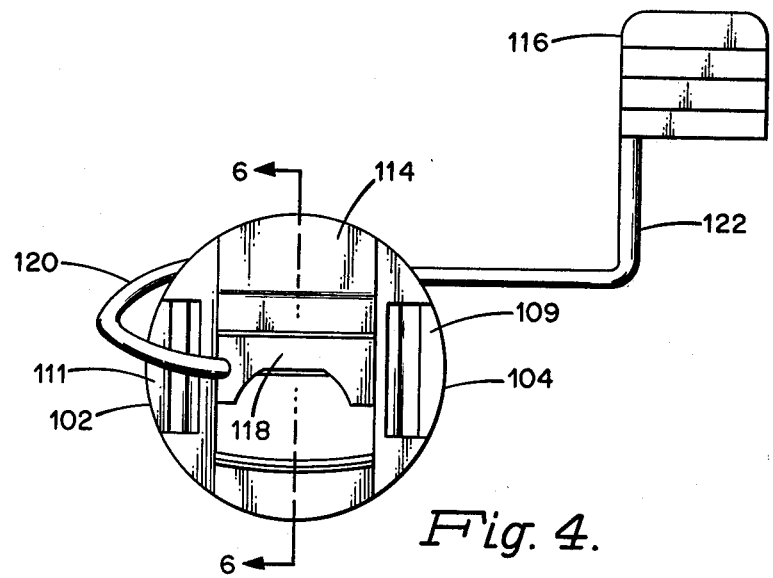
FIG. 4 illustrates in front view the electrical bushing clamp of FIGS. 1 and 2 with the clamping member for accomodating larger cable sizes inserted in the clamp passageway.
Figure 5:
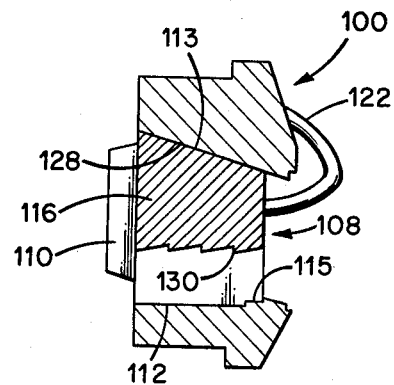
FIG. 5 is a cut-away side view of the electrical bushing clamp of FIGS. 1 and 2, the cut taken generally along line 5—5 of FIG. 3.

Surfaces 124 and 128 of the clamping members 118 and 116, respectively, are smooth to permit these surfaces to slide easily aginst the roof surface 113 of the passageway of body member 114 when either of the two clamping members is individually inserted into the passageway of body member 114, as shown in FIG. 3 or 4.

Although both clamping members 116 and 118 are generally wedge-shaped, the average thickness of clamping member 116, defined by the spacing between the exterior surfaces 128 and 130, is greater than the average thickness of clamping member 118, defined by the spacing between the exterior surfaces 124 and 126. The different thicknesses of the two clamping members allows for a choice of members to be inserted in clamp passageway 114 depending upon the size of cable to be accomodated.

Figure 7:
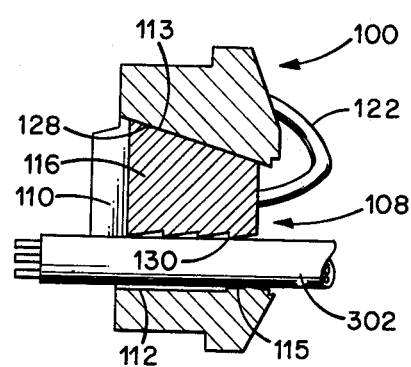
FIG. 7 shows the cut-away view of FIG. 5 with a smaller size cable clamped in place in the bushing clamp.
Figure 6:
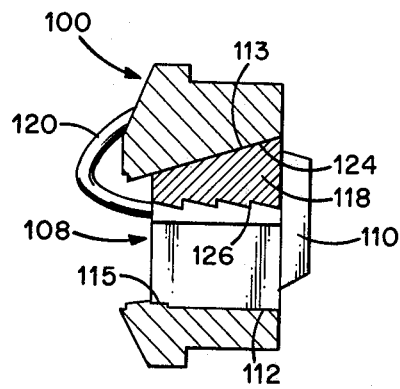
FIG. 6 is a cut-away side view of the electrical bushing clamp of FIGS. 1 and 2, the cut taken generally along line 6—6 of FIG. 4.

As shown in cut-away cross-section in FIG. 7, clamping member 116 is inserted in the passageway and clamps a smaller size or flat cable 302 such as a No. 10 two-wire plus ground, No. 12 two-wire plus ground, or No. 14 two-wire plus ground.

Figure 8:
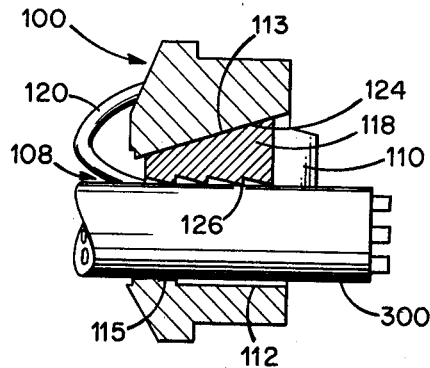
FIG. 8 shows the cut-away view of FIG. 6 with a larger size cable clamped in place in the bushing clamp.

FIG. 8 shows in cut-away cross-section clamping member 118 inserted in the passageway clamping a larger size or round cable 300 such as a No. 12 three-wire plus ground, or No. 14 three-wire plus ground.

Clamping members 116 and 118 are attached to the body member 114 by flexible and resilient tethers 120 and 122. In a preferred embodiment of the invention, the bushing clamp is molded in one piece of a flexible thermoplastic material such a polyethylene, polypropylene, polytetrafluorethylene, polyvinylchloride, or the like. Each clamping member 116 or 118 is alternatively and individually insertable into the passageway of body member 114 by twisting the flexible tether as shown in FIG. 3 or 4.

When either clamping member 116 or 118 is inserted into the passageway of body member 114, the tendency of the resilient tether 120 or 122 to restore to its original position prior to the insertion of the clamping member, serves to urge the clamping member toward the entrance port of the passageway.

Tethers 120 and 122 each have a generally right angled bend which facilitates insertion of either clamping member in the passageway. The right angle bend in either tether 120 or 122 further serves as a stop to prevent the clamping member inserted in the passageway from passing completely through the body member 114. Thus, the tethers 120 and 122 serve not only to connect members of the clamp device of the present invention, but also to bias and restrain clamping members 116 and 118 when they are inserted into body member 114.

In an alternative embodiment shown in FIG. 12, clamping member 116a is provided with an extension or protrusion 131a.

Clamping member 118a is similarly provided with an extension or protrusion 129a. The extensions function to prevent either clamping member from being pushed completely through the passageway of body member 114 by a cable during installation.

Figure 9:
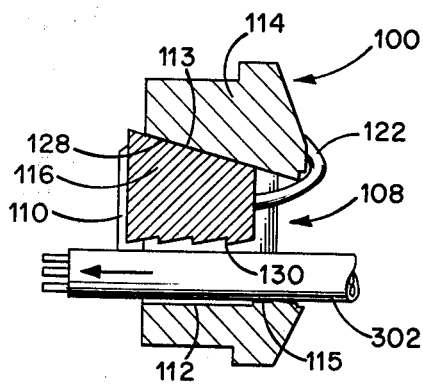
FIG. 9 shows the cut-away side view of FIG. 7 showing release of an electrical cable from the bushing clamp.

As shown in FIG. 9, a cable 302 is installed in the bushing clamp 100 with the clamping member 116 inserted in the passageway of body member 114. During insertion, the cable pushes the clamping member 116 in the direction of the arrow, causing the surface 128 of of the member 116 to move slidably along the surface 113 of the body member 114. The cable so installed lies between the serrated surface 130 of the clamping member 114 and the serrations 115 of the interior floor surface of the body member 114. When forward motion of the cable stops, the restoring action of the resilient tether 122 causes the clamping member 116 to move toward the entrance port 108 of the passageway, causing the serrated surface 130 of the clamping member 116 to contact the sheath of cable 302. When the cable is pulled in the direction from the exit port 110 to entrance port 108 clamping member 116 moves slidably in the same direction, along surface 13. Clamping member 116 thus tightly wedges between surface 113 and the cable 302, firmly engaging the cable 302 as shown in FIG. 7, preventing its further movement out of the bushing clamp 100. Clamping member 118 functions in a similar manner when inserted into the passageway of body member 114 for use with larger sizes of electrical cable.

Alternatively, the clamping member may be firmly tightened or wedged against the cable by pulling or pushing the clamping member in the direction of the entrance port. One convenient method of accomplishing this is by inserting a screwdriver or similar tool in the loop formed by the tether strip after the clamping member and cable have been inserted, and pulling with a leverage action.

A clamped cable is easily repositioned in the bushing clamp of the present invention without the need of any tools by simply moving the cable or the clamping member in a direction from the entrance port to the exit port. As shown in FIG. 9, this action causes clamping member 116 to move slidably in the passageway of body member 114, releasing the cable. In the alternative embodiment shown in FIG. 12, the clamping members 116a and 118a may conveniently be moved by merely pressing on extension 129a or 131a when either member is clamping a cable in the passageway.

The cable is reclamped by pulling the cable or moving the clamping member in a direction from the exit port to the entrance port.

Should the need arise to completely remove a clamped cable from the device of the present invention, pushing inward on the clamping member or its tether strip releases the cable allowing for its withdrawal from the bushing clamp.

Improved bushing clamp devices in accordance with the present invention provide for the insertion of a cable into the device either prior to or subsequent to installation of the clamp device in a wiring box knockout aperture.

The device also permits easy and convenient repositioning or removal of a clamped cable without the need for any tools.

Devices according to the present invention thus allow for both common practices among electrical installers of inserting cable clamps in each wiring box as the installation is made or attaching cable clamps to the ends of pre-cut lengths of cable in the so-called harness method of installation.

While there has been shown and described what is at present considered the preferred embodiments of the invention, it will be obvious to those skilled in the art that various changes and modifications may be made therein without departing from the scope of the invention as defined by the appended claims.

What is claimed is:

1. An electrical bushing clamp for non-metallic sheathed cable comprising:
   a one-piece tubular body member having securing means for affixing said bushing clamp in a knockout aperture of an electrical wiring box;
   said tubular body member having a passageway to permit the passage of a cable therethrough, said passageway having an entrance port and an exit port;
   said tubular body member having first and second interior surfaces which define opposed walls of said passageway;
   said first interior surface providing a first engaging means for engaging a cable passed through said bushing clamp;
   said second interior surface being continuously sloped with respect to said first interior surface whereby said entrance port is smaller than said exit port;
   a clamping member insertable into said passageway, through said entrance port, said clamping member having a first and a second exterior surface which define opposite surfaces of said clamping member;
   said first exterior surface being sloped with respect to said second exterior surface of said clamping member;
   said first exterior surface for slidably coacting with said second interior surface of said tubular member when said clamping member is inserted in said passageway;
   said second exterior surface providing a second engaging means for engaging a cable passed through said bushing clamp when said clamping member is inserted in said passageway; and
   biasing means for urging said clamping member in a direction toward said entrance port when said clamping member is inserted in said passageway;
   whereby when a cable is passed through said bushing clamp and lies between said first engaging means and said second engaging means, movement of the cable in a direction from said exit port to said entrance port causes said clamping member to move slidably in said passageway, binding down upon and firmly clamping said cable between said first and said second engaging means; and movement of the cable in a direction from said entrance port to said exit port causes said clamping member to move slidably in said passageway, releasing said cable.

2. An electrical bushing clamp in accordance with claim 1 wherein said biasing means is a flexible and resilient tether connecting said tubular body member to said clamping member.

3. An electrical bushing clamp in accordance with claim 2 wherein said second engaging means is a serrated surface of said clamping member.

4. An electrical bushing clamp in accordance with claim 1 wherein said first engaging means is a serrated interior wall surface of said passageway of said tubular body member.

5. An electrical bushing clamp for non-metallic sheathed cable comprising:

a one-piece tubular body member having securing means for affixing said bushing clamp in a knock-out aperture of an electrical wiring box;

said tubular body member having a passageway to permit the passage of a cable therethrough, said passageway having an entrance port and an exit port;

said tubular body member having first and second interior surfaces which define opposed walls of said passageway;

said first interior surface providing a first engaging means for engaging a cable passed through said bushing clamp;

said second interior surface being continuously sloped with respect to said first interior surface whereby said entrance port is smaller than said exit port;

first and second clamping members individually insertable into said passageway through said entrance port, said clamping members each having first and second opposite exterior surfaces;

said first and second exterior surfaces of each clamping member being sloped with respect to one another;

said first exterior surface of each clamping member for slidably coacting with said second interior surface of said tubular body member when either of said clamping members is individually inserted in said passageway;

said second exterior surface of each clamping member providing a second engaging means for engaging a cable passed through said bushing clamp when either of said clamping members is individually inserted in said passageway, the thickness of said first clamping member being less than that of said second clamping member to accomodate non-metallic sheathed cable of various sizes; and biasing means for urging each of said clamping members in a direction toward said entrance port when either of said clamping members is individually inserted in said passageway;

whereby when a cable is passed through said bushing clamp and lies between said first engaging means and said second engaging means, movement of the cable in a direction from said exit port to said entrance port causes said clamping member to move slidably in said passageway, binding down upon and firmly clamping said cable between said first and said second engaging means; and movement of the cable in a direction from said entrance port to said exit port causes said clamping member to move slidably in said passageway, releasing said cable.

6. An electrical bushing clamp in accordance with claim 5 wherein said biasing means is a flexible and resilient tether connecting said tubular body member to each of said first and second clamping members.

7. An electrical bushing clamp in accordance with claim 5 wherein said first engaging means is a serrated interior wall surface of said passageway of said tubular body member.

8. An electrical bushing clamp in accordance with claim 5 wherein said securing means includes a flange on said tubular body member for preventing the passage of said bushing clamp completely through the knockout aperture of a wiring box, and a pair of flexible and resilient flaps, connected at one end of each to said tubular body member, said flaps each extending outward at an angle from said tubular body member and ending at a distal surface being opposed and spaced apart from said flange, whereby said flaps flex inwardly toward said tubular body member to permit said bushing clamp to be installed in a wiring box aperture, and upon insertion of said clamp, said flaps restore to their original position for securing said clamp in said aperture.

9. An electrical bushing clamp in accordance with claim 8 wherein said flaps further include a protrusion on the distal surface of each for preventing excessive lateral movement of said flaps when said bushing clamp is inserted in an aperture of an electrical wiring box.

10. An electrical bushing clamp in accordance with claim 1 or claim 5 wherein said clamp is molded in one piece of thermoplastic material.

11. An electrical bushing clamp in accordance with claim 5 wherein said second engaging means is a serrated surface of each of said first and said second clamping members.

* * * * *